(12) United States Patent
Hufnagel et al.

(10) Patent No.: US 10,544,898 B2
(45) Date of Patent: Jan. 28, 2020

(54) SAFETY DEVICE AND METHOD FOR MONITORING A MACHINE

(71) Applicant: PILZ GMBH & CO. KG, Ostfildern (DE)

(72) Inventors: Mark Hufnagel, Ostfildern (DE); Roland Leibfarth, Ostfildern (DE)

(73) Assignee: PILZ GMBH & CO. KG, Ostfildern (DE)

(*) Notice: Subject to any disclaimer, the term of this patent is extended or adjusted under 35 U.S.C. 154(b) by 12 days.

(21) Appl. No.: 16/032,422

(22) Filed: Jul. 11, 2018

(65) Prior Publication Data

US 2018/0328537 A1 Nov. 15, 2018

Related U.S. Application Data

(63) Continuation of application No. PCT/EP2016/082933, filed on Dec. 30, 2016.

(30) Foreign Application Priority Data

Jan. 12, 2016 (DE) ........................ 10 2016 100 445

(51) Int. Cl.
*F16P 3/14* (2006.01)
*B26D 7/22* (2006.01)
(Continued)

(52) U.S. Cl.
CPC ............ *F16P 3/142* (2013.01); *B23D 59/001* (2013.01); *B26D 7/22* (2013.01); *B30B 15/288* (2013.01)

(58) Field of Classification Search
CPC ......... F16P 3/142; B23D 59/001; B26D 7/22; B30B 15/288
See application file for complete search history.

(56) References Cited

U.S. PATENT DOCUMENTS

| 4,907,432 A | 3/1990 | Maillefer |
| 9,346,091 B2 | 5/2016 | Hufnagel et al. |

(Continued)

FOREIGN PATENT DOCUMENTS

| DE | 10027156 A1 | 12/2001 |
| DE | 10327388 A1 | 1/2005 |

(Continued)

OTHER PUBLICATIONS

International Search Report for PCT/EP2016/082933; dated Apr. 10, 2017; 2 pp.

(Continued)

*Primary Examiner* — Sean M Michalski
(74) *Attorney, Agent, or Firm* — Harness, Dickey & Pierce, P.L.C.

(57) ABSTRACT

A machine has a first machine part and a second machine part. The first machine part carries out a working movement towards the second machine part in order to machine a workpiece. The first machine part has a leading edge, which defines a movement plane in the course of the working movement. For safeguarding the machine, a plurality of images including spatially resolved representations of the edge, at least a part of the workpiece, and a protective region defined between the edge and the second machine part are acquired. A motion speed of the first machine part relative to the second machine part is determined on the basis of the plurality of images. The motion speed is compared to a reference speed value or speed profile, defining a nominal speed of the first machine part relative to the second machine part during the working movement and an acceptable tolerance interval. The working movement is stopped if the motion speed deviates from the reference speed beyond the tolerance interval.

19 Claims, 4 Drawing Sheets

(51) Int. Cl.
   *B23D 59/00*   (2006.01)
   *B30B 15/28*   (2006.01)

(56) References Cited

U.S. PATENT DOCUMENTS

| | | | |
|---|---|---|---|
| 2002/0104958 A1 | 8/2002 | Fiessler | |
| 2009/0015663 A1* | 1/2009 | Doettling | F16P 3/14 |
| | | | 348/46 |
| 2010/0220184 A1 | 9/2010 | Appleyard et al. | |
| 2012/0123563 A1* | 5/2012 | Drinkard | F16P 3/144 |
| | | | 700/13 |
| 2015/0049911 A1* | 2/2015 | Doettling | F16P 3/142 |
| | | | 382/103 |
| 2015/0228078 A1* | 8/2015 | Zahand | G06K 9/00771 |
| | | | 382/103 |
| 2015/0364021 A1* | 12/2015 | Ur | F16P 3/142 |
| | | | 340/573.1 |
| 2016/0155306 A1* | 6/2016 | Kawanaka | F16P 3/142 |
| | | | 340/555 |
| 2016/0260027 A1* | 9/2016 | Kuwabara | B25J 13/08 |
| 2016/0318142 A1* | 11/2016 | Maharshi Ramaswamy | |
| | | | F16P 3/142 |
| 2017/0227163 A1* | 8/2017 | Campbell | B27G 19/06 |
| 2018/0232593 A1* | 8/2018 | Tani | G06K 9/2054 |
| 2018/0349654 A1* | 12/2018 | Takeshima | B25J 9/1676 |
| 2019/0234559 A1* | 8/2019 | Guynn | B23D 59/002 |
| 2019/0257471 A1* | 8/2019 | Casagrande | F16M 11/08 |

FOREIGN PATENT DOCUMENTS

| | | |
|---|---|---|
| DE | 102010011786 A1 | 9/2011 |
| EP | 2553312 B1 | 9/2014 |
| WO | WO-2013156575 A1 | 10/2013 |

OTHER PUBLICATIONS

English translation of International Preliminary Report on Patentability (Chapter I) for PCT/EP2016/082933; dated Jul. 17, 2018; 7 pp.

* cited by examiner

SAFETY DEVICE AND METHOD FOR MONITORING A MACHINE

CROSS REFERENCES TO RELATED APPLICATIONS

This application is a continuation of international patent application PCT/EP2016/082933 filed on Dec. 30, 2016 designating the U.S., which international patent application has been published in German language and claims priority from German patent application 10 2016 100 445.6 filed on Jan. 12, 2016. The entire contents of these priority applications are incorporated herein by reference.

BACKGROUND OF THE INVENTION

The present invention relates to a method and a device for monitoring or safeguarding a machine having a first machine part that carries out a working movement towards a second machine part in order to machine a workpiece. More particularly, the invention relates to a method and a device for monitoring and safeguarding a bending press, press brake, stamping machine, or cutting machine, although it is not restricted thereto and can likewise be used in other machines.

Bending or folding is a known method for machining workpieces. Machining of the workpiece essentially takes place in that a tool is pressed against a matrix. The intermediate space between the tool and the matrix is typically monitored by an optical camera-based protective system during the downward travel of the tool, in order to prevent body parts of the operator from entering the opening gap between the tool and the matrix while the machine is running.

In such camera-based protective systems, a protective zone is typically monitored between the tool and the matrix, which protective zone is reduced during the downward travel in the vertical direction to avoid an unintentional safety shutdown. During the reduction and/or deactivation of the protective zone, which takes place step-by-step, however, an overrun travel of the tool has to be safeguarded in order to ensure the required safety of the operator. The motion speed of the tool is therefore typically decelerated in the region of the workpiece, in order to reduce a corresponding overrun travel and to ensure the safety of the operator. Since the reduced motion speed during the downward travel of the tool reduces the general productivity of the machine, however, the corresponding braking procedure is desired to be initiated as late as possible.

In order to ensure the reduced motion speed of the tool, the position of the tool is usually cyclically acquired from incremental encoders and processed in a separate processor. In a following processing cycle, the position and process data thus ascertained are then output to a control module, which shuts down the movement of the tool in the event of respective deviations.

SUMMARY OF THE INVENTION

In view of the above, it is an object of the present invention to provide a method and a device for monitoring or safeguarding a machine of the afore-mentioned type with short reaction time.

It is another object of the invention to provide a method and a device for monitoring or safeguarding a machine of the afore-mentioned type with little technical expenditure.

It is another object of the invention to provide a method and a device for monitoring or safeguarding a machine of the afore-mentioned type, which allow for high productivity of the machine.

According to an aspect of the invention, there is provided a method for safeguarding a machine having a first machine part and a second machine part, wherein said first machine part carries out a working movement towards the second machine part in order to machine a workpiece, and wherein said first machine part has a leading edge in a direction of movement, said leading edge defining a movement plane, the method comprising the steps of acquiring a plurality of images having a plurality of pixels, with respective images from the plurality of images including spatially resolved representations of the edge, at least a part of the workpiece, and a protective region defined between the edge and the second machine part, determining a motion speed of the first machine part relative to the second machine part in the course of the working movement on the basis of the plurality of images, comparing the motion speed to a reference speed value, said reference speed value defining a nominal speed of the first machine part relative to the second machine part during the working movement and a tolerance interval, and stopping the working movement if the motion speed determined on the basis of the plurality of images deviates from the reference speed value beyond the tolerance interval.

There is also provided a method for monitoring a machine having a first machine part and a second machine part, wherein said first machine part carries out a working movement towards the second machine part in order to machine a workpiece, and wherein the first machine part has a leading edge in the movement direction, which leading edge defines a movement plane, comprising the steps of acquiring a plurality of images having a plurality of pixels, wherein respective images from the plurality of images have spatially resolved representations of the edge, at least a part of the workpiece, and a protective region defined between the edge and the second machine part, determining a motion speed of the first machine part in relation to the workpiece on the basis of the plurality of images during the working movement, comparing the motion speed to a reference motion speed of the working movement, and stopping the working movement if the motion speed does not correspond to the reference motion speed.

There is also provided a safety device for safeguarding a machine having a first machine part and a second machine part, wherein said first machine part carries out a working movement towards the second machine part in order to machine a workpiece, and wherein said first machine part has a leading edge in a direction of movement, which leading edge defines a movement plane, the safety device comprising an image sensor having a plurality of pixels for recording a plurality of spatially resolved images of the edge, at least a part of the workpiece, and a protective region defined between the edge and the second machine part, comprising an image processing unit coupled to the image sensor and configured to determine a motion speed of the first machine part relative to the workpiece on the basis of the plurality of images, and comprising a control unit coupled to the image processing unit and configured to compare the motion speed and a reference motion speed and to stop the working movement if the motion speed does not correspond to the reference motion speed.

Because the motion speed of the first machine part in relation to the workpiece is determined on the basis of the plurality of acquired images, technically complex incremental encoders for determining the position of the first machine part can generally be dispensed with. Therefore, the technical expenditure for determining the motion speed of the working movement is generally reduced. In addition, the acquisition and processing speed may substantially be reduced by the comparison of the acquired motion speed to the reference motion speed, and the reaction speed may substantially be reduced in case of fault. The movement of a machine part of the monitored machine can therefore be reliably acquired with a reduced reaction time and with little technical expenditure.

In a refinement, the motion speed during the working movement is acquired between a predefined position of the edge of the first machine part and an end point of the working movement. It is preferable in this case that the motion speed is accordingly acquired and monitored beginning from a predefined distance of the first machine part from the end point of the working movement. In the case of a reduced opening gap between the first machine part and the workpiece, a reduced motion speed of the first machine part can thus be ensured, and therefore an overrun travel can be safeguarded accordingly.

In this refinement, it is preferred if the predefined position of the edge of the first machine part is determined by an optical measurement barrier. It is particularly preferable in this case if the optical measurement barrier is designed as a leading optical measurement barrier, which is interrupted at a corresponding distance of the edge or the first machine part from the workpiece and thus activates the motion speed measurement at a predefined distance.

The safeguarding of the motion speed of the first machine part from a predefined opening gap can thus be ensured reliably with little technical expenditure.

In a further refinement, the motion speed of the working movement is continuously reduced between the predefined position of the edge of the first machine part and the end point of the working movement. In one particular refinement, the motion speed of the working movement is reduced by a braking procedure of the first machine part, wherein the braking procedure is initiated before the motion speed of the working movement is acquired and secured.

The overrun travel of the first machine part can thus be reduced with decreasing distance to the workpiece due to the reduced motion speed, whereby the safety of the operator can be increased.

In a further refinement, the protective region is reduced in accordance with a distance between the edge and the workpiece during the working movement between the predefined position and the end point of the working movement. In other words, individual protective zones which are adjacent to the workpiece are dynamically deactivated in accordance with the distance between the edge and the workpiece.

Unintentional stopping of the working movement can thus be prevented.

In a further refinement, the acquisition of the motion speed of the working movement of the first machine part in relation to the workpiece is started together with the step-by-step reduction of the protective region by deactivating individual protective zones by way of the interruption of the optical measurement barrier.

The required monitoring of the motion speed and the corresponding reduction of the overrun travel by the reduced motion speed are thus activated by the activation of the protective region reduction.

In a further refinement, the reference motion speed is configured beforehand in a configuration step.

The reference motion speed can thus be individually adapted and set and the motion speed of the first machine part can be monitored and ensured in accordance with the necessary requirements.

Alternatively, the reference motion speed is predefined before startup of the machine, so that the motion speed of the first machine part in relation to the workpiece can be ensured with little expenditure.

In a further refinement, the motion speed of the working movement is determined, as a function of a position of the edge of the first machine part, as a motion speed profile on the basis of the acquired images, wherein the motion speed profile is compared to a reference motion speed profile. The reference motion speed profile is preferably defined in this case by a plurality of distance-time value pairs and in one particular refinement is defined by a straight line between two distance-time value pairs.

The motion speed of the edge of the first machine part in relation to the workpiece can thus be monitored for each position and safeguarded accordingly.

In a further refinement, the position of the edge of the first machine part is acquired as a distance to the workpiece.

The motion speed of the first machine part can thus be reduced in accordance with a size of the opening gap between the edge of the first machine part and the workpiece and the reduced motion speed can be acquired accordingly.

In a further refinement, the working movement of the first machine part is stopped if the acquired motion speed is greater than the reference motion speed.

The motion speed of the first machine part in relation to the workpiece can thus be limited, and therefore an overrun travel of the first machine part upon shutdown of the working movement is accordingly limited and the safety of the operator is thus increased.

In a further refinement, the protective region as a monitored region between the edge and the second machine part is spaced apart from the edge of the first machine part (20), wherein the distance of the protective region from the edge is variably adjustable.

The distance of the protective region can thus be individually adapted to the corresponding requirements of the production, wherein the distance can be selected as minimal to be able to implement the highest possible motion speed of the working movement and be able to approach the workpiece at a high motion speed, wherein the distance can accordingly be selected as larger to avoid nonsafety-relevant shutdowns and shutdowns due to accumulations of tool chips. An individual production-adapted monitoring of the protective region is thus possible.

In a further refinement, different positions of the first machine part and/or the workpiece are determined on the basis of pattern recognition in the plurality of images, wherein the motion speed of the working movement is acquired on the basis of a temporal and spatial difference of the acquired positions. In this case, an upper edge of the workpiece is preferably acquired by means of an edge detection algorithm in a grayscale image.

A spatial distance between the edge and the workpiece and accordingly the motion speed of the working movement can thus be acquired with a high resolution, and therefore a precise determination of the motion speed of the working movement is possible.

In a further refinement, in this case the positions of the first machine part and/or the workpiece are acquired on the basis of an interpolation between recognized patterns of the plurality of images. In this case, a parabolic interpolation is carried out in particular.

The acquisition of the positions of the first machine part and/or the workpiece in a spatial resolution less than one pixel is thus possible.

In a further refinement, the measured values of the different positions and the measured values of the motion speed of the working movement are filtered through a low-pass filter.

Interference during the acquisition of the different positions and the motion speed can thus be reduced.

In a further refinement, the different positions of the first machine part and/or the workpiece in the plurality of images are acquired on the basis of individual pixel signals, wherein the motion speed of the working movement is ascertained on the basis of a time difference of the pixel signals and on the basis of a distance of the corresponding pixels. In this case, in particular the time of an initial interruption of a corresponding pixel is stored and the motion speed of the working movement is ascertained via a division of the distance of two pixels and the associated time difference of the signal interruption.

The motion speed of the working movement can thus be ascertained on the basis of the image data with little technical expenditure.

In a further refinement, in this case the position of the first machine part and/or the workpiece is acquired on the basis of a fixed threshold value of the individual pixel signals.

The position of the first machine part and/or the workpiece can thus be reliably acquired on the basis of individual pixel signals with little technical expenditure.

In a further refinement, the plurality of images is acquired at a predefined time interval.

The motion speed of the working movement can thus be ascertained with little technical expenditure and reliably.

In a further refinement, the plurality of images is acquired by an image sensor having a plurality of pixels.

An acquisition of the motion speed of the working movement is thus possible with little technical expenditure.

In a further refinement, the protective region is illuminated by a light emitter and projected onto the image sensor. In this case, the protective region is preferably arranged between the light emitter and the image sensor.

Reliable monitoring of the protective region and reliable determination of the motion speed of the working movement is thus possible with little technical expenditure.

In a further refinement, the image sensor moves as a co-runner with the first machine part. In this case, the image sensor is preferably mechanically fixedly connected to the first machine part.

An optical alignment of the image sensor is thus possible with little technical expenditure and a reliable acquisition of the protective region is possible during the working movement.

Overall, the new method and device enable a reliable determination of the motion speed of the first machine part in relation to the workpiece and therefore reliable safeguarding of an overrun travel with a short reaction time with little technical expenditure, and therefore the safety of the operator can be ensured overall.

It goes without saying that the above-mentioned features and the features to be explained hereafter are applicable not only in the respective specified combination but rather also in other combinations or alone, without leaving the scope of the present invention.

BRIEF DESCRIPTION OF THE DRAWINGS

Exemplary embodiments of the invention are illustrated in the drawing and will be explained in greater detail in the following description. In the drawing.

DESCRIPTION OF PREFERRED EMBODIMENTS

Figure 1:
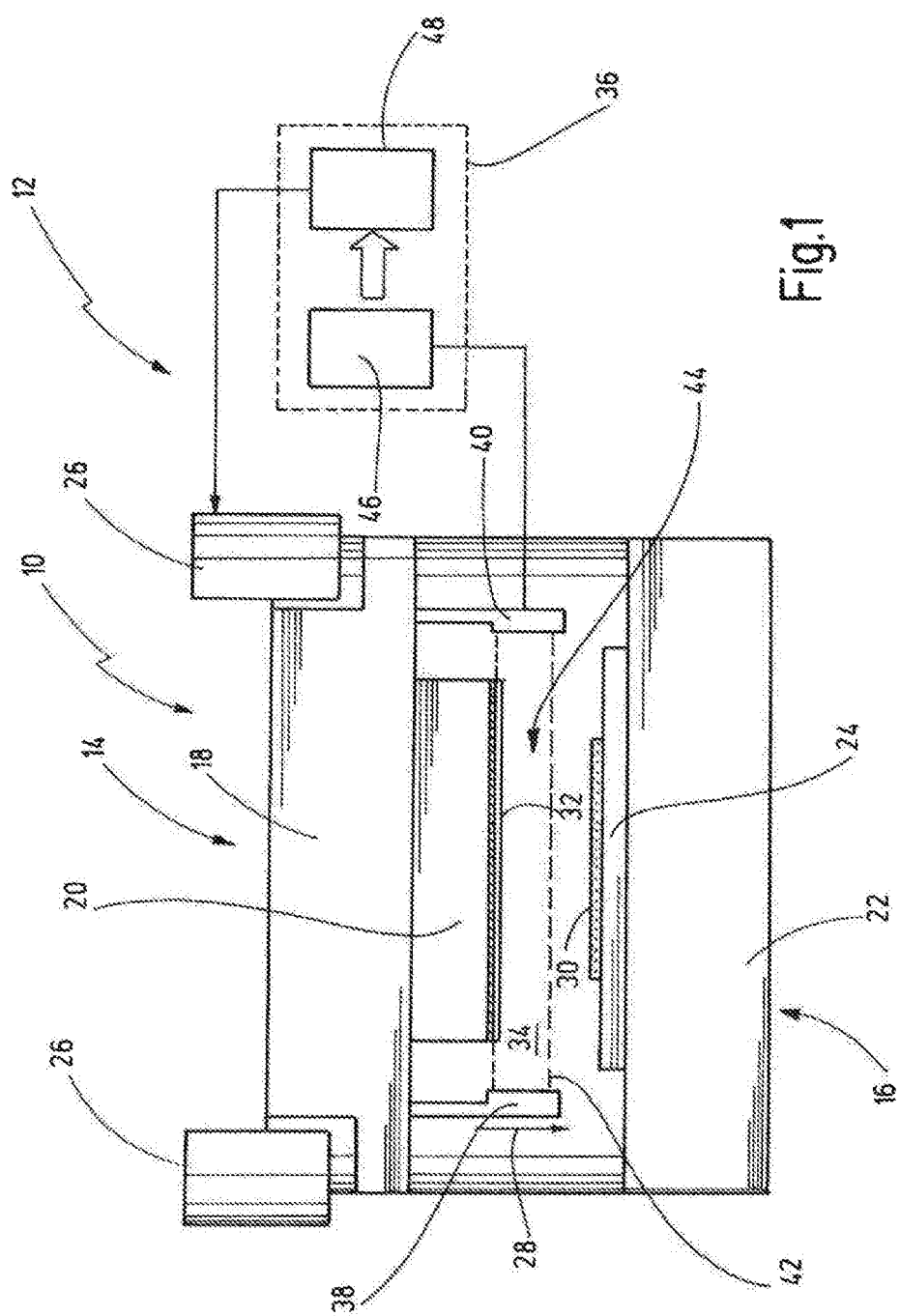
FIG. 1 shows a schematic illustration of a bending press comprising a safety device.

In FIG. 1, a bending press is illustrated in its entirety as a preferred machine for a safety device and is designated in general with 10. A safety device 12 according to an exemplary embodiment is used on the bending press 10 to prevent an injury of operators in the working sequence of the bending press 10. The use of the safety device 12 is not restricted to bending presses, but rather can be employed in presses in general and also in other machines, in which two machine parts execute a working movement toward one another, for example, in stamping and cutting machines.

The bending press 10 has a first machine part 14, an upper machine part in this case, and a second, lower machine part 16. The first machine part 14 has an upper beam 18, on which an upper tool 20, for example, a bending stamp, is arranged. The second machine part 16 has a lower beam 22, on which a lower tool 24, for example, a matrix, is arranged. The first machine part can execute a working movement in the direction of an arrow 28 via a drive 26. The upper tool 20 (bending stamp) and the lower tool 24 (matrix) together form a pressing tool, using which a workpiece 30 can be machined and/or formed. The workpiece 30 is generally a metallic sheet-metal part.

The upper tool 20 has a leading edge 32, which defines a movement plane 34 as a result of the working movement 28. Any intrusion of an object into the movement plane 34, such as an intrusion of an operator's hand, represents a hazardous situation, in particular if the upper tool 20 has already approached closely to the lower tool 24. The safety device 12, which also includes a control unit 36, is used for the purpose of safeguarding a movement of the upper tool 20 until reaching a safe reduced motion speed or until an opening gap between the upper tool 20 and the workpiece 30 falls below a predefined value. This reduced motion speed must not be exceeded, to limit an overrun travel of the upper tool 20 in case of a shutdown and thus ensure the safety of an operator in a hazardous situation.

The safety device 12 has a light emitter 38 and an image sensor 40, which are each fastened on the upper beam 18 here. The light emitter 38 and the image sensor 40 are coupled to the upper beam 18, and therefore they run together with the working movement of the upper tool. Alternatively, the light sensor 38 and the image sensor 40 can be coupled to the lower tool 16 or a frame of the bending press 10. The light emitter 38 generates light beams 42, which extend parallel to the leading edge 32 of the upper tool 20 and illuminate the image sensor 40. Accordingly, the light emitter 38 and the image sensor 40 form a light barrier, by which a protective region 44 is formed between the upper tool 20 and the lower tool 24, in order to acquire a position of the upper tool 20 in relation to the lower tool 24 and to acquire a motion speed of the working movement 28 of the upper tool 20 in relation to the lower tool 24.

The image sensor 40 has a plurality of pixels and acquires a plurality of spatially resolved images in a predefined time pattern, which images respectively show and/or contain the edge 32 of the upper tool 20 and at least a part of the workpiece 30. The spatially resolved images furthermore include the protective region 44 between the upper tool 20 and the lower tool 24.

Figure 3:
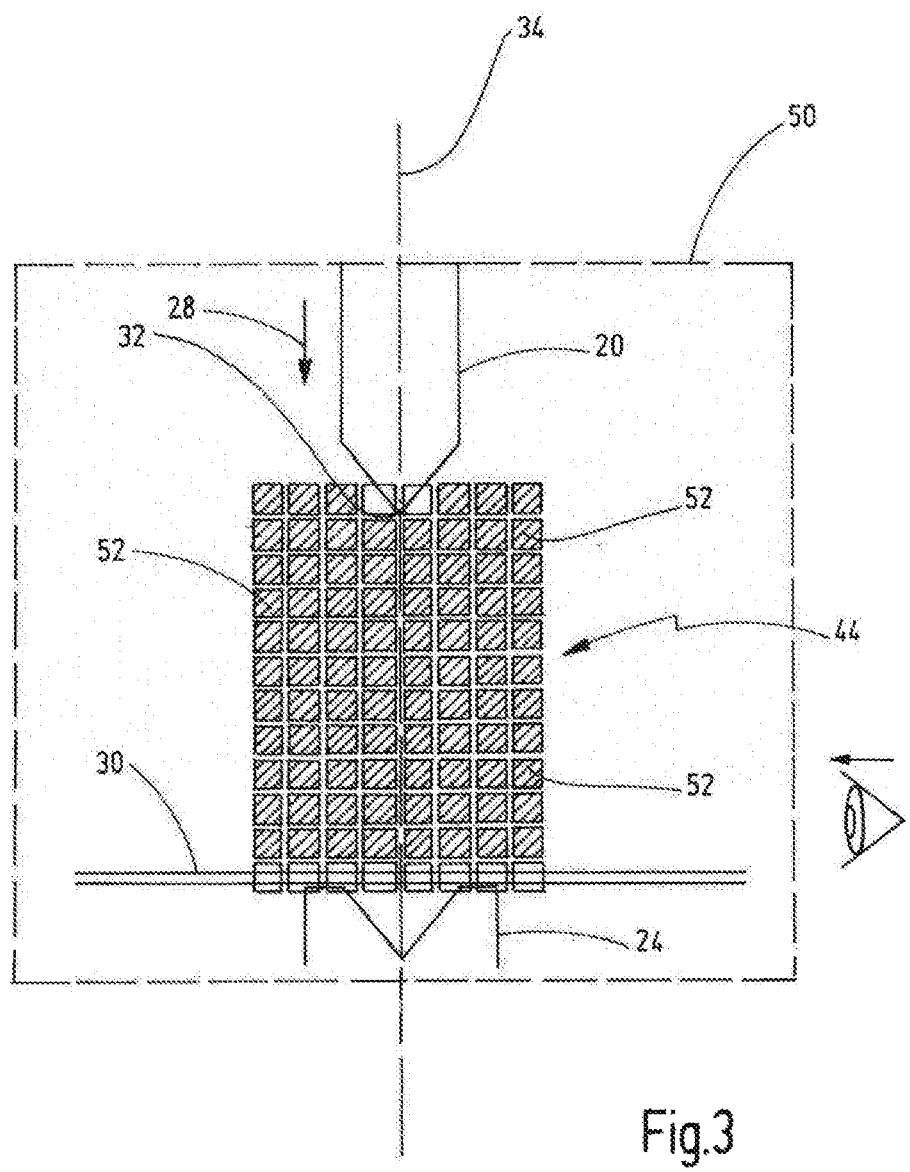
FIG. 3 shows a schematic illustration of an image of a protective region of the bending press from FIG. 1.

The light emitter 38 has a light source, which is a so-called power LED in one particularly preferred embodiment. In principle, the light emitter could also have, however, a laser diode, fluorescent tube, halogen lamp, or another light source. The image sensor 40 having the plurality of pixels is preferably an image sensor having a matrix-type arrangement of the pixels, as schematically shown in FIG. 3. The image sensor 40 is preferably a CMOS image sensor having a logarithmic transducer characteristic curve. The image sensor 40 can have an imaging optical unit, to ensure appropriate imaging of the edge 32, the protective region 44, and a part of the workpiece 30.

Figure 2:
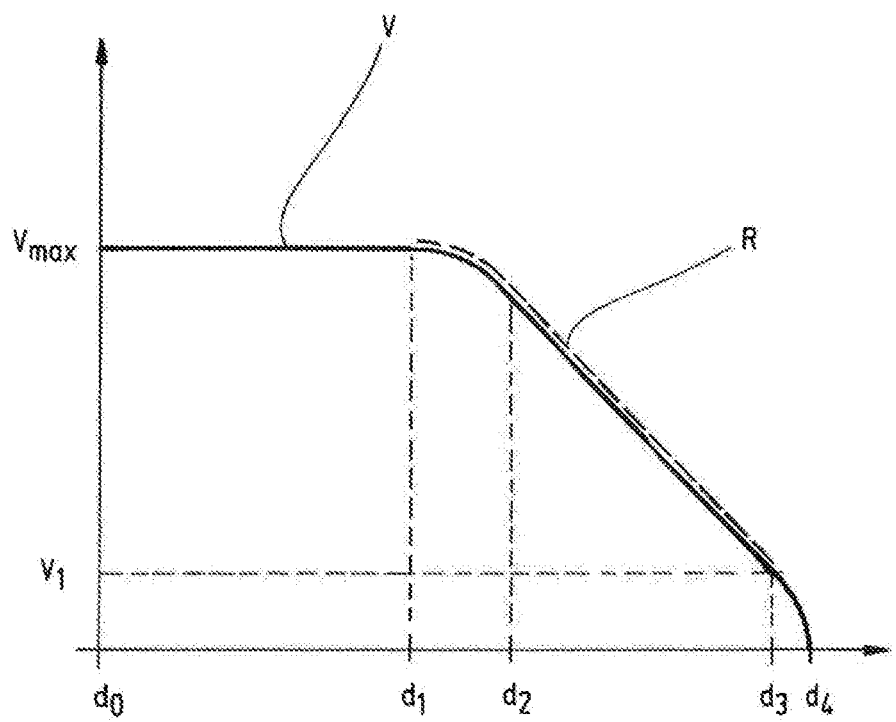
FIG. 2 shows a diagram to explain a braking ramp of a machine part of the bending press from FIG. 1.

The safety device 12 furthermore includes the control unit 36. The control unit 36 can be arranged separately from the light emitter 38 and the image sensor 40. Alternatively, the control unit 36 can be entirely or partially integrated into the light emitter 38 and/or the image sensor 40. The control unit 36 has an image processing unit 46, which is coupled to the image sensor 40 and is used to analyze the plurality of images which are recorded by the image sensor 40 and accordingly to determine a position of the upper tool 20 in relation to the lower tool 24 and to determine a motion speed of the working movement 28 of the upper tool 20 in relation to the lower tool 24 on the basis of the images. The analysis of the images of the image sensor 40 preferably takes place in this case on the basis of pattern recognition or on the basis of individual pixel signals of the pixels of the image sensor 40, as explained hereafter. The analysis unit 46 determines the motion speed of the upper tool 20 in relation to the lower tool 24 as a motion speed profile as a function of a position of the upper tool 20 and/or as a function of a distance between the edge 32 and the workpiece 30 and/or the lower tool 24. An example of such a motion speed profile is schematically illustrated in FIG. 2.

The analysis unit 46 and a control circuit 48 are part of the control unit 36. The analysis unit 46 transmits the determined motion speed profile and/or the acquired motion speed of the upper tool 20 in relation to the lower tool 24 as a function of the respective position of the upper tool 20 and/or the distance of the upper tool 20 from the lower tool 24 to the control circuit 48. The control circuit 48 compares the motion speed of the working movement 28 to a reference motion speed of the working movement 28 or to a reference motion speed profile of the working movement 28. If the acquired motion speed of the working movement 28 deviates from the reference motion speed of the working movement 28 and in particular if the motion speed of the working movement 28 is greater than the reference motion speed, a corresponding control signal is transmitted from the control circuit 48 to the drive 26 and the working movement 28 of the upper tool 20 is accordingly stopped.

During the working movement 28, protective zones of the protective region 44 in the vicinity of the workpiece 30 are deactivated with decreasing distance of the upper tool 20 in relation to the lower tool 24, to prevent an unintentional interruption of the working movement 28 due to an interruption of the corresponding protective zone by the workpiece or other objects, for example, workpiece chips. With decreasing distance between the edge 32 and the workpiece 30, protective zones are thus increasingly deactivated step-by-step, wherein the motion speed of the working movement 28 has to be reduced simultaneously in order to reduce or limit an overrun travel of the upper tool 20 or the edge 32 in the event of a protective shutdown and accordingly ensure the safety of the operator. The motion speed of the working movement 28 is therefore reduced with the deactivation of the first protective zone and preferably reduced using a linear motion speed curve. The monitoring of the motion speed of the upper tool 20 in relation to the lower tool 24 is started with the deactivation of the first protective zone, wherein the corresponding position of the upper tool 20 and/or the distance of the upper tool 20 from the lower tool 24 is acquired by the interruption of a leading measurement beam by the workpiece 30 and accordingly the first protective zone is deactivated and the motion speed monitoring is activated. The motion speed of the working movement 28 is reduced such that with deactivation of the last protective zone of the protective region 44, a predefined motion speed of the working movement 28 is reached, which is preferably less than or equal to 10 mm/s.

Due to the monitoring of the motion speed in the region of the starting point of the motion speed reduction or the braking ramp, a clamping point, i.e., a position of the upper edge of the workpiece 30 in relation to the edge 32 can also be ascertained. The reference motion speed profile defines the starting point of the motion speed reduction of the working movement 28 or the starting point of the braking ramp and differs from a measured motion speed profile of the working movement 28 having an object on the workpiece 30, for example, a hand applied. If the measured motion speed profile deviates from the reference profile, the working movement 28 is stopped or interrupted accordingly. Clamping point monitoring using incremental encoder and correspondingly acquired position values can thus generally be dispensed with.

The reference motion speed profile is configured or determined once in a configuration step, wherein in a simplest case, the reference motion speed profile is defined by two distance-motion speed value pairs, which are connected by a straight line. Such value pairs preferably have a maximum distance from one another and preferably form end points of the motion speed straight line or the braking ramp. The position of the edge 32 in the reference motion speed profile represents a distance of the edge 32 from the clamping point in this case, i.e., the upper edge of the workpiece 30, and is therefore identical to an opening gap between the edge 32 and the workpiece 30. The configuration of the positions or the distance parameters preferably takes place in steps of 0.1 mm at a motion speed of 1 mm/s. Alternatively, the configuration can be predefined and stored in a memory in the analysis unit 46.

In one particular embodiment, the distance of the protective region 44 in relation to the edge 32 can be designed as adjustable. In this case, the user can accordingly establish the position of the edge 32 at which the protective zone is deactivated. The distance of the protective region 44 from the edge 32 of the upper tool 20 can be selected freely in this case and preferably configured in 0.4 mm steps between a distance of 1.6 mm and 4 mm. The distance of the protective region 44 from the tool 32 can thus be set with respect to the motion speed of the working movement 28 dependent thereon, wherein the motion speed of the working movement 28 can be selected as greater in the case of a small distance or the braking ramp can be selected as steeper and has to be selected as smaller or has to have a lesser slope in the case of a greater distance.

FIG. 2 schematically shows a diagram of the motion speed V of the working movement 28 as a function of a position of the edge 32. The motion speed V of the working movement 28 extends from a starting point $d_0$ as the beginning of the working movement at a maximum motion speed $V_{max}$ consistently up to a position $d_1$. At the position $d_1$, the motion speed of the working movement 28 is reduced. At the position $d_2$, the deactivation of protective zones in the region of the workpiece 30 is initiated or started with the interruption of the leading measurement beam by the workpiece 30. The motion speed V of the working movement 28 is reduced, preferably linearly, up to a position $d_3$. At the position $d_3$, a last protective zone of the protective region 44 is deactivated and the motion speed V has a value $V_1$, which is less than or equal to 10 mm/s. After traversing the position $d_3$, an end point of the working movement 28 is reached, at which the edge 32 contacts the workpiece 30, and therefore the motion speed of the working movement 28 is reduced to zero up to the position $d_4$ and the upper tool 20 accordingly comes to a standstill.

In FIG. 2, the reference motion speed R is schematically shown by dashed lines, the reference motion speed R at every position between $d_1$ and $d_3$ representing a maximum permissible value for the motion speed of the working movement 28. If the motion speed of the working movement 28 exceeds the reference motion speed R, the working movement 28 is stopped or interrupted, and the upper tool 20 therefore comes to a standstill. The required reduction of the working motion speed 28 can thus be reliably monitored and a corresponding overrun travel in the event of an emergency shutdown can be limited.

The motion speed V is preferably linearly reduced, as shown in FIG. 2, wherein the reference motion speed is preferably defined over two distance-motion speed value pairs.

The positions $d_1$, $d_2$, and $d_3$ each correspond to a distance of the edge 32 from the workpiece 30 during the working movement 28.

FIG. 3 shows a simplified illustration of an image 50, which is recorded by the image sensor 14 and which generally (in each case at least partially) shows a representation of the upper tool 20 with the edge 32, the workpiece 30, and the lower tool 24, and also the protective region 44. The viewing direction from FIG. 1 is schematically shown in FIG. 3. The image 50 of the image sensor 40 has a plurality of pixels 52, of which only a few are schematically shown here. On the basis of a plurality of images of the image sensor 40, the position of the edge 32 in relation to the workpiece 30 and also the motion speed of the working movement 28 of the edge 32 in relation to the workpiece 30 are acquired, to monitor the motion speed of the working movement 28 in particular during the braking procedure and accordingly limit the overrun travel for an emergency shutdown. The image sensor 40 can be illuminated from an opposite side by the light emitter 38, and therefore the edge 32 of the upper tool 20 and the workpiece 30 create a shadow in the image 40.

To monitor the motion speed of the working movement 28 and to monitor the clamping point, the position of the edge 32 in relation to the workpiece 30 can be ascertained and, from the time curve of the position, the motion speed of the working movement 28 can be ascertained by means of two different algorithms.

According to a first embodiment, the position of the edge 32 and the workpiece 30 can be ascertained on the basis of pixel signals of the individual pixels 52, wherein a position of the edge 32 and the workpiece 30 is acquired, if the respective pixel signal falls below a predefined threshold value. In other words, the position of the edge 32 and the workpiece 30 is acquired on the basis of the shadow, which is created by the upper tool 20 and the workpiece 30 due to the illumination by the light emitter 38.

Upon an initial interruption of the pixel signal by the corresponding shadow image, the time of the interruption is stored. The motion speed of the working movement 28 of the edge 32 in relation to the workpiece 30 can be computed via the division of the distance of two pixels 52 which are interrupted successively and the difference of the associated interruption time. The time resolution of this method corresponds to the image sequence of the individual images of the image sensor 40 and the spatial resolution corresponds to the grid of the pixels 52 of the image sensor 40.

According to an alternative embodiment, the position of the edge 32 and the workpiece 30 and the time curve of the position for ascertaining the motion speed of the working movement 28 is ascertained by a pattern recognition or an edge detection in a grayscale image of the image 50. The position of the edge 32 or the workpiece 30 is preferably ascertained by means of a parabolic interpolation. The motion speed of the working movement 28 is ascertained in this case via a division of the spatial distance of the edge 32 and the workpiece 30 ascertained from the edge detection or the pattern recognition and the corresponding time difference of the associated images. The time resolution of this method corresponds to the time interval of the recorded images of the image sensor 14, wherein the spatial resolution due to the parabolic interpolation is less than the grid of the pixels 52. In one particular embodiment, the images 50 of the image sensor 40 are filtered through a black-and-white low-pass filter to filter out interference and avoid measurement errors.

Figure 4:
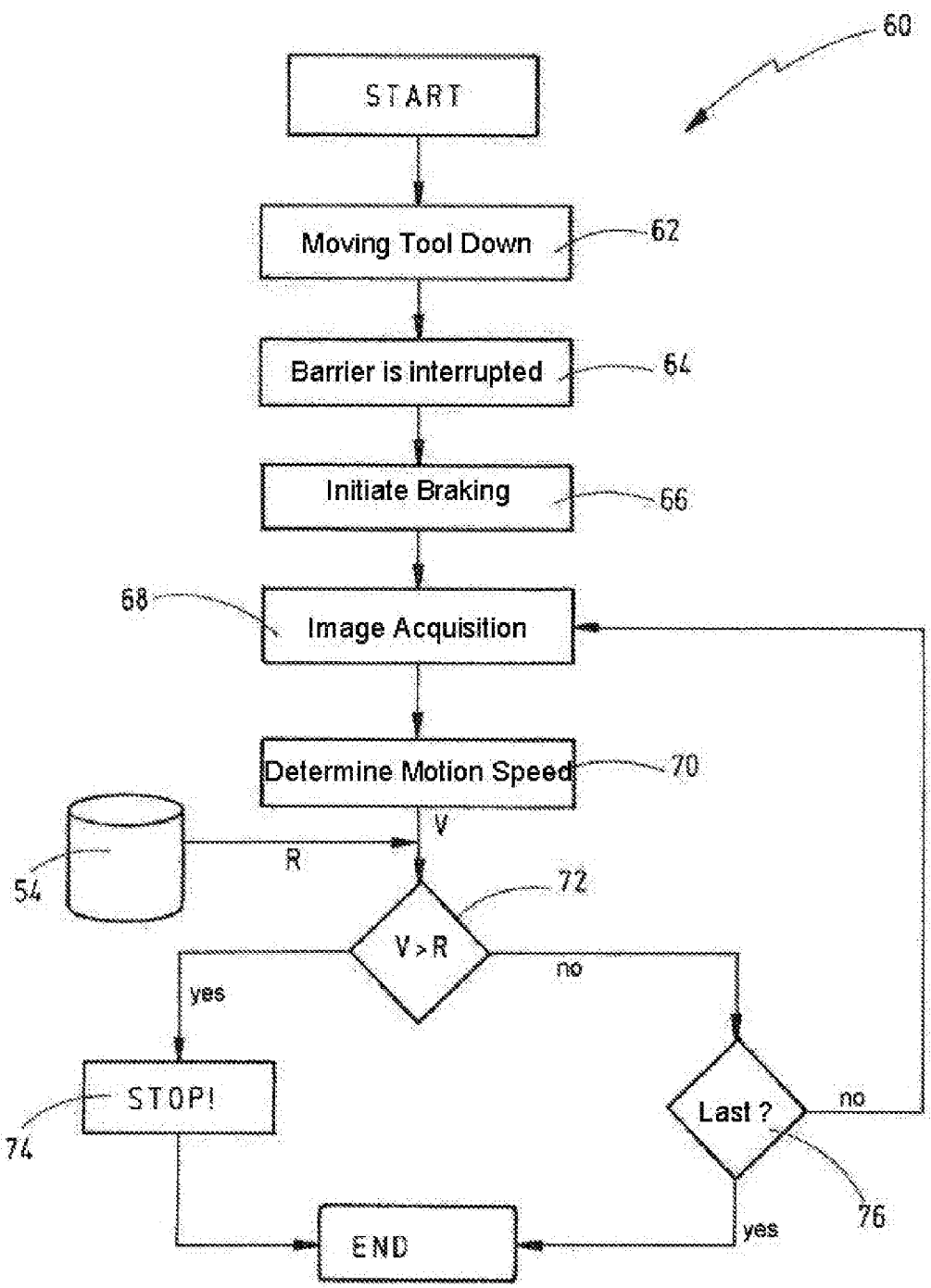
FIG. 4 shows a schematic flow chart to explain the method for monitoring the bending press from FIG. 1.

FIG. 4 shows a flow chart of an exemplary embodiment of a method for monitoring the working movement 28. The method is identified in general with 60.

The method 60 begins at step 62 with moving down of the upper tool 20 until the optical measurement barrier is interrupted (step 64). As soon as the optical barrier is interrupted, the working motion speed 28 of the upper tool 20 is braked and at the same time the first protective zone of the protective region 44 is deactivated (step 66). With or after initiation of the braking procedure, a plurality of images 50 are acquired by the image sensor 40, wherein the images 50 include a respective representation of the edge 32 and the workpiece 30 (step 68). The position of the edge 32 or the upper tool 20 in relation to the workpiece 30 is determined and a motion speed V of the working movement 28 of the upper tool 20 in relation to the workpiece 30 is determined (step 70) from the images 50.

The motion speed V of the working movement 28 is compared to a reference motion speed R, which is stored in a memory 54, as shown in step 72. If the acquired motion speed V of the working movement 28 is greater than the reference motion speed R, according to step 74, an emergency stop is triggered and the working movement 28 of the upper tool 20 is stopped.

If it is established in step 72 that the acquired motion speed V is less than or equal to the reference motion speed R, it is checked in step 76 whether a last protective zone of the protective region 44 is already deactivated or an end of the reference motion speed profile R is reached at $d_3$. If a last of the protective zones is deactivated or the reference motion speed profile has been traversed, the method 60 ends. If protective zones of the protective region 44 are still active or the motion speed reference profile has not been completely traversed, the method returns to step 68 and acquires one or more further images 50 by means of the image sensor 40.

The braking procedure of the upper tool 20 can be monitored with little technical expenditure and a maximum motion speed of the working movement 28 can be checked as a function of the respective position of the upper tool 20 in relation to the lower tool 24 by the method 60. Furthermore, the clamping point, i.e., the position of the edge 32 in relation to the workpiece 30 can be monitored. The clamping point monitoring begins together with the interruption of the optical measurement barrier, wherein the braking procedure of the working movement 28 is initiated before the start of the clamping point monitoring.

What is claimed is:

1. A method for safeguarding a machine having a first machine part and a second machine part, wherein said first machine part carries out a working movement towards the second machine part in order to machine a workpiece, and wherein said first machine part has a leading edge in a direction of movement, said leading edge defining a movement plane, the method comprising the following steps:
   acquiring a plurality of images having a plurality of pixels, with respective images from the plurality of images including spatially resolved representations of the edge, at least a part of the workpiece, and a protective region defined between the edge and the second machine part,
   determining a motion speed of the first machine part relative to the second machine part in the course of the working movement on the basis of the plurality of images,
   comparing the motion speed to a reference speed value, said reference speed value defining a nominal speed of the first machine part relative to the second machine part during the working movement and a tolerance interval, and
   stopping the working movement if the motion speed determined on the basis of the plurality of images deviates from the reference speed value beyond the tolerance interval.

2. The method of claim 1, wherein the motion speed of the first machine part is determined in the form of a motion speed profile along the working movement, wherein the reference speed value defines a nominal speed profile representing decreasing motion speed along the working movement, and wherein the motion speed profile is compared to the nominal speed profile.

3. A method for monitoring a machine having a first machine part and a second machine part, wherein said first machine part carries out a working movement towards the second machine part in order to machine a workpiece, and wherein the first machine part has a leading edge in the movement direction, which leading edge defines a movement plane, comprising the following steps:
   acquiring a plurality of images having a plurality of pixels, wherein respective images from the plurality of images have spatially resolved representations of the edge, at least a part of the workpiece, and a protective region defined between the edge and the second machine part,
   determining a motion speed of the first machine part in relation to the workpiece on the basis of the plurality of images during the working movement,
   comparing the motion speed to a reference motion speed of the working movement, and
   stopping the working movement if the motion speed does not correspond to the reference motion speed.

4. The method of claim 3, wherein the motion speed during the working movement is determined between a predefined position of the edge of the first machine part and an end point of the working movement.

5. The method of claim 4, wherein the predefined position of the edge is determined by an optical measurement barrier.

6. The method of claim 4, wherein the motion speed of the working movement is continuously reduced between the predefined position and the end point of the working movement.

7. The method of claim 4, wherein the protective region is reduced during the working movement between the predefined position and the end point of the working movement in accordance with a distance of the edge from the workpiece.

8. The method of claim 3, wherein the reference motion speed is configured beforehand in a configuration step.

9. The method of claim 3, wherein the motion speed is determined as a motion speed profile defining an instantaneous motion speed as a function of a position of the edge, and wherein the motion speed profile is compared to a reference motion speed profile.

10. The method of claim 9, wherein the position of the edge of the first machine part is acquired as a distance to the workpiece.

11. The method of claim 3, wherein the working movement of the first machine part is stopped if the acquired motion speed is greater than the reference motion speed.

12. The method of claim 3, wherein the protective region is spaced apart from the edge by a distance that is variably adjustable.

13. The method of claim 3, wherein positions of at least one of the first machine part and the workpiece are determined on the basis of pattern recognition using the plurality of images, and wherein the motion speed is determined on the basis of a temporal and spatial difference among the positions.

14. The method of claim 13, wherein the positions are determined on the basis of an interpolation between recognized patterns in the plurality of images.

15. The method of claim 3, wherein positions of at least one of the first machine part and the workpiece are determined on the basis of individual pixel signals, and wherein the motion speed is determined on the basis of a temporal difference among individual pixel signals and on the basis of a distance of corresponding pixels.

16. The method of claim 3, wherein the plurality of images are acquired at a predefined time intervals.

17. The method of claim 3, wherein the plurality of images are acquired by an image sensor having a plurality of pixels.

18. The method of claim 17, wherein the protective region is illuminated by a light emitter and projected onto the image sensor.

19. A safety device for safeguarding a machine having a first machine part and a second machine part, wherein said first machine part carries out a working movement towards the second machine part in order to machine a workpiece, and wherein said first machine part has a leading edge in a direction of movement, which leading edge defines a movement plane, the safety device comprising:
   an image sensor having a plurality of pixels for recording a plurality of spatially resolved images of the edge, at least a part of the workpiece, and a protective region defined between the edge and the second machine part,
   an image processing unit coupled to the image sensor and configured to determine a motion speed of the first machine part relative to the workpiece on the basis of the plurality of images, and a control unit coupled to the image processing unit and configured to compare the motion speed and a reference motion speed and to stop the working movement if the motion speed does not correspond to the reference motion speed.

* * * * *